United States Patent
Agirman (10) Patent No.: US 11,482,942 B2
(45) Date of Patent: Oct. 25, 2022

(54) SINGLE PHASE OPERATION OF THREE PHASE REGENERATIVE DRIVES

(71) Applicant: OTIS ELEVATOR COMPANY, Farmington, CT (US)

(72) Inventor: Ismail Agirman, Southington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 635 days.

(21) Appl. No.: 15/799,387

(22) Filed: Oct. 31, 2017

(65) Prior Publication Data

US 2019/0131882 A1 May 2, 2019

(51) Int. Cl.
| | |
|---|---|
| *H02P 6/06* | (2006.01) |
| *H02M 5/458* | (2006.01) |
| *B66B 1/30* | (2006.01) |
| *H02P 27/08* | (2006.01) |
| *H02M 7/04* | (2006.01) |

(Continued)

(52) U.S. Cl.
CPC ............ *H02M 5/4585* (2013.01); *B66B 1/00* (2013.01); *B66B 1/30* (2013.01); *B66B 1/308* (2013.01); *H02M 5/00* (2013.01); *H02M 5/40* (2013.01); *H02M 7/00* (2013.01); *H02M 7/04* (2013.01); *H02M 7/68* (2013.01); *H02P 27/06* (2013.01); *H02P 27/085* (2013.01); *H02P 2201/03* (2013.01)

(58) Field of Classification Search
CPC .............. H02P 2201/03; H02P 27/085; H02M 5/4585; B66B 1/308
USPC ....................................................... 318/400.3
See application file for complete search history.

(56) References Cited

U.S. PATENT DOCUMENTS

| | | |
|---|---|---|
| 4,503,938 A | 3/1985 | Nomura |
| 5,880,415 A | 3/1999 | Colby et al. |

(Continued)

FOREIGN PATENT DOCUMENTS

| | | |
|---|---|---|
| CN | 1102278 A | 5/1995 |
| CN | 105253751 A | 1/2016 |

(Continued)

OTHER PUBLICATIONS

European Search Report for application 18203607.9, dated Apr. 5, 2019, 11 pages.

(Continued)

*Primary Examiner* — Kawing Chan
*Assistant Examiner* — Gabriel Agared
(74) *Attorney, Agent, or Firm* — Cantor Colburn LLP (57) ABSTRACT

A three-phase regenerative drive configured for operation from a single phase alternating current (AC) power source, the three-phase regenerative drive including a three-phase converter having inputs for connection to a single-phase AC source, the three-phase converter having three phase legs, a three-phase inverter for connection to a motor, the three phase inverter configured to provide three phase command signals to the motor, and a DC bus connected between the three-phase converter and the three-phase inverter. A first phase leg of the three-phase converter and a second phase leg of the three-phase converter are employed to direct current from the single-phase AC source to the DC Bus and a third phase leg of the three phase legs of the three-phase converter returns current to a return of the AC source.

6 Claims, 5 Drawing Sheets

(51) Int. Cl.
  *H02M 7/00* (2006.01)
  *B66B 1/00* (2006.01)
  *H02M 5/00* (2006.01)
  *H02M 5/40* (2006.01)
  *H02P 27/06* (2006.01)
  *H02M 7/68* (2006.01)

(56) References Cited

U.S. PATENT DOCUMENTS

| | | |
|---|---|---|
| 6,690,587 B2 | 2/2004 | Hur et al. |
| 7,246,686 B2 | 7/2007 | Smith et al. |
| 7,609,534 B2* | 10/2009 | Agirman ............... B66B 1/30 363/36 |
| 7,859,217 B2 | 12/2010 | Mayhew |
| 8,230,987 B2 | 7/2012 | Agirman et al. |
| 8,629,637 B2 | 1/2014 | Blasko et al. |
| 8,988,026 B2* | 3/2015 | Ahmed ............... H02M 5/4585 318/400.13 |
| 9,036,379 B2 | 5/2015 | Schroeder et al. |
| 9,099,935 B2* | 8/2015 | Swamy ............... H02M 1/4225 |
| 9,461,559 B2* | 10/2016 | Patel ............... H02M 7/217 |
| 10,069,444 B2* | 9/2018 | Niwa ............... H02P 4/00 |
| 2005/0224296 A1 | 10/2005 | Smith et al. |
| 2006/0034364 A1* | 2/2006 | Breitzmann ........ H02M 5/4585 375/238 |
| 2007/0253231 A1* | 11/2007 | Agirman ................. B66B 1/30 363/148 |
| 2010/0091529 A1 | 4/2010 | Jakeman et al. |
| 2017/0025981 A1* | 1/2017 | Patel ............... H02M 1/4225 |
| 2017/0129428 A1* | 5/2017 | Isoda ............... B60L 58/26 |

FOREIGN PATENT DOCUMENTS

| | | |
|---|---|---|
| GB | 2116791 A | 9/1983 |
| JP | 2012056646 A | 3/2012 |
| WO | 2006022725 A2 | 3/2006 |

OTHER PUBLICATIONS

"Multilevel Inverters: A Survey of Topologies, Controls, and Applications"; Jose Rodriguez et al.; IEEE Transactions on Industrial Electronics, vol. 49, No. 4, Aug. 2002; pp. 724-738; 15 pgs.
Chinese Office Action for Application No. 201811282073.9; dated Apr. 13, 2022; 8 Pages.

* cited by examiner

Prior Art

SINGLE PHASE OPERATION OF THREE PHASE REGENERATIVE DRIVES

TECHNICAL FIELD

The subject matter disclosed herein relates generally to conveyance systems, and more particularly to a conveyance system having regenerative three phase drives electrically operating from a single phase alternating current (AC) source.

BACKGROUND

Electric motors are well known and widely used. They come in a variety of sizes and styles. One example use of an electric motor is in an elevator machine that moves a drive sheave for propelling an elevator cab up or down through a hoistway, for example. Another use for an electric motor in a heating ventilation, air conditioning or refrigeration systems (HVACR).

Recently, regenerative drive machines have been introduced particularly into elevator systems. Regenerative drive machines include an electric motor that draws power from a power source for purposes of moving a car and counterweight through a hoistway in a first direction and generates power that is provided back to the power source when allowing the car and counterweight to move in an opposite direction. The regenerative drives take advantage of the ability of an electric motor to act as a generator when the weight of the car and counterweight cause the desired movement as long as the drive machine allows the drive sheave to be moved accordingly. Such regenerative drive machines typically operate on a three phase power input. However, there are times when a three phase power input is not available. For example, during initial elevator system installation, a three phase power supply to a building site is not usually available. This limits the ability to utilize a three phase, regenerative drive machine.

BRIEF SUMMARY

According to an exemplary embodiment, described herein is a three-phase regenerative drive configured for operation from a single phase alternating current (AC) power source, the three-phase regenerative drive including a three-phase converter having inputs for connection to a single-phase AC source, the three-phase converter having three phase legs, a three-phase inverter for connection to a motor, the three phase inverter configured to provide three phase command signals to the motor, and a DC bus connected between the three-phase converter and the three-phase inverter. A first phase leg of the three-phase converter and a second phase leg of the three-phase converter are employed to direct current from the single-phase AC source to the DC Bus and a third phase leg of the three phase legs of the three-phase converter returns current to a return of the AC source.

In addition to one or more of the features described above or below, or as an alternative, further embodiments could include that each phase leg of the three phase legs of the three-phase converter includes a first and a second switching device.

In addition to one or more of the features described above or below, or as an alternative, further embodiments could include a controller for providing control signals to the three-phase converter to control respective contributions of current via the first phase leg and the second phase leg to the DC Bus by the single-phase AC source and to control the return of current to the AC source via the third phase leg.

In addition to one or more of the features described above or below, or as an alternative, further embodiments could include that the control signals include at least a first set of pulse width modulation (PWM) signals to control at least the first and second switching devices of the first phase leg and second phase leg of the three phase converter, and a second set of pulse width modulation (PWM) signals to control the first and second switching devices of the third phase leg.

In addition to one or more of the features described above or below, or as an alternative, further embodiments could include that the first set of PWM signals operates at a first frequency and the second set of PWM signals operates at a second frequency, the second frequency different than the first, the second frequency corresponding to the frequency of the single phase AC source.

In addition to one or more of the features described above or below, or as an alternative, further embodiments could include the controller configured to generate control signals to the three-phase inverter.

In addition to one or more of the features described above or below, or as an alternative, further embodiments could include that the respective contributions of current via the first phase leg and the second phase leg to the DC Bus are about equal and the current returned to the AC source via the third phase leg is about a total of the respective contributions of current via the first phase leg and the second phase leg.

In addition to one or more of the features described above or below, or as an alternative, further embodiments could include a filter interposed between the AC source and the three-phase converter.

In addition to one or more of the features described above or below, or as an alternative, further embodiments could include that the filter comprises at least two series reactances configured to transfer current from the AC source to the first phase leg and the second phase leg.

In addition to one or more of the features described above or below, or as an alternative, further embodiments could include that the drive is derated by no more than about 25%.

Also described herein in another embodiment is a method of operating a three phase regenerative drive to drive a motor from a single phase AC source, the drive comprising a three-phase converter, an inverter and a DC bus connected between the converter and the inverter. The method includes connecting a single-phase AC source to the three phase converter, directing current flow from a supply of the single-phase AC source to the DC bus via a first phase leg and a second phase leg of the three-phase converter; and returning current to a return of the AC source via a third phase leg of the three phase converter.

In addition to one or more of the features described above or below, or as an alternative, further embodiments could include that each phase leg of the three phase legs of the three-phase converter includes a first and a second switching device.

In addition to one or more of the features described above or below, or as an alternative, further embodiments could include controlling the three-phase converter to control respective contributions of current via the first phase leg and the second phase leg to the DC Bus by the single-phase AC source and to control the return of current to the AC source via the third phase leg.

In addition to one or more of the features described above or below, or as an alternative, further embodiments could include that the controlling includes generating control signals comprising at least a first set of pulse width modulation (PWM) signals to control at least the first and second switching devices of the first phase leg and second phase leg of the three phase converter, and a second set of pulse width modulation (PWM) signals to control the first and second switching devices of the third phase leg.

In addition to one or more of the features described above or below, or as an alternative, further embodiments could include that the first set of PWM signals operates at a first frequency and the second set of PWM signals operates at a second frequency, the second frequency different than the first, the second frequency corresponding to the frequency of the AC source.

In addition to one or more of the features described above or below, or as an alternative, further embodiments could include generating control signals to the three-phase inverter to generate three phase command signals from the DC bus to supply the motor.

In addition to one or more of the features described above or below, or as an alternative, further embodiments could include interposing a filter between the AC source and the three-phase converter.

In addition to one or more of the features described above or below, or as an alternative, further embodiments could include that the filter comprises at least two series reactances configured to transfer current from the AC source to the first phase leg and the second phase leg.

In addition to one or more of the features described above or below, or as an alternative, further embodiments could include derating the three phase drive by no more than about 25%.

In addition to one or more of the features described above or below, or as an alternative, further embodiments could include that the drive and the motor is connected to an elevator system.

Other aspects, features, and techniques of embodiments will become more apparent from the following description taken in conjunction with the drawings.

BRIEF DESCRIPTION OF THE DRAWINGS

The described subject matter is particularly pointed out and distinctly claimed in the claims at the conclusion of the specification. The foregoing and other features, and advantages are apparent from the following detailed description taken in conjunction with the accompanying drawings in which:

DETAILED DESCRIPTION

In general, embodiments herein relate to a regenerative drives employing an active converter to supply a DC bus that in turn supplies voltage to an inverter that generates motor excitation signals to drive a motor. The regenerative drives take advantage of the ability of an electric motor to act as a generator when the weight of the car and counterweight cause the desired movement as long as the drive machine allows the drive sheave to be moved accordingly. Such regenerative drive machines typically operate on a three phase power input. However, there are times when a three phase power input is not available. For example, during initial elevator system installation, a three phase power supply to a building site is not usually available. At best, single phase power may be available during elevator system installation. It is desirable to be able to move the elevator car in at least a limited mode during installation in many instances. The difficulty is that without three phase power, a three phase regenerative drive machine is not able to operate and, therefore, cannot be used during elevator installation. There is a need for being able to utilize a three phase, regenerative drive machine with only single phase power.

Embodiments herein are directed to configuring and controlling the converter to operate from a single phase AC source. Embodiments herein set forth a drive and motor system and/or method for a converter to actively control a DC voltage typically generated from an AC side sinusoidal current. The DC voltage is employed to generate AC excitation voltage using fast switching of power electronics devices to control a motor. Moreover, switching of power electronics devices in active front-end rectifier also generates electromagnetic interference (EMI), which can pose potential problems for nearby and connected components. EMI filters are designed to attenuate EMI noise to satisfy the EMI standards, which are defined for particular applications, but EMI filters add weight and complexity for the rectifier system.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

In an embodiment, a three-phase drive operating from a single phase AC source is utilized in an electric motor system or power system. In one application, the power system is part of an elevator system. The elevator system also includes a hoistway having one or more of lanes or shafts. In each shaft, one or more elevator car travels to deliver passengers to a desired floor of a building. The electric motor system utilizes the power electronics inverter (e.g., as variable speed alternating drive (AC) motor drive) to improve the performance of maneuvering the elevator cars. Other applications and embodiments include powers systems for trains, boats, planes, etc.

Further, in another embodiment a three phase drive is used to drive a motor in a heating ventilation and air conditioning or refrigeration system HVAC/R system. The conventional HVAC/R system incorporates a closed refrigerant loop in a vapor compression cycle. The vapor-compression cycle uses a circulating refrigerant as the medium which absorbs and removes heat from the space to be cooled and subsequently rejects that heat elsewhere. All such systems have four basic components: a compressor, a condenser, a thermal expansion valve (also called a throttle valve or metering device), and an evaporator. In large scale HVAC systems or chillers, the compressor is large and driven by a very large motor requiring dedicated motor drives such as described herein with high voltage and current capabilities. In some instances the drive may include a converter that is a three-phase active front-end. The drive may also include a power electronics inverter (e.g., as a variable speed alternating current (AC) motor drive) to improve the performance of the chiller system. In an embodiment a three phase active converter operating from a single phase excitation and three phase inverter is used to drive a motor is disclosed.

Figure 1:
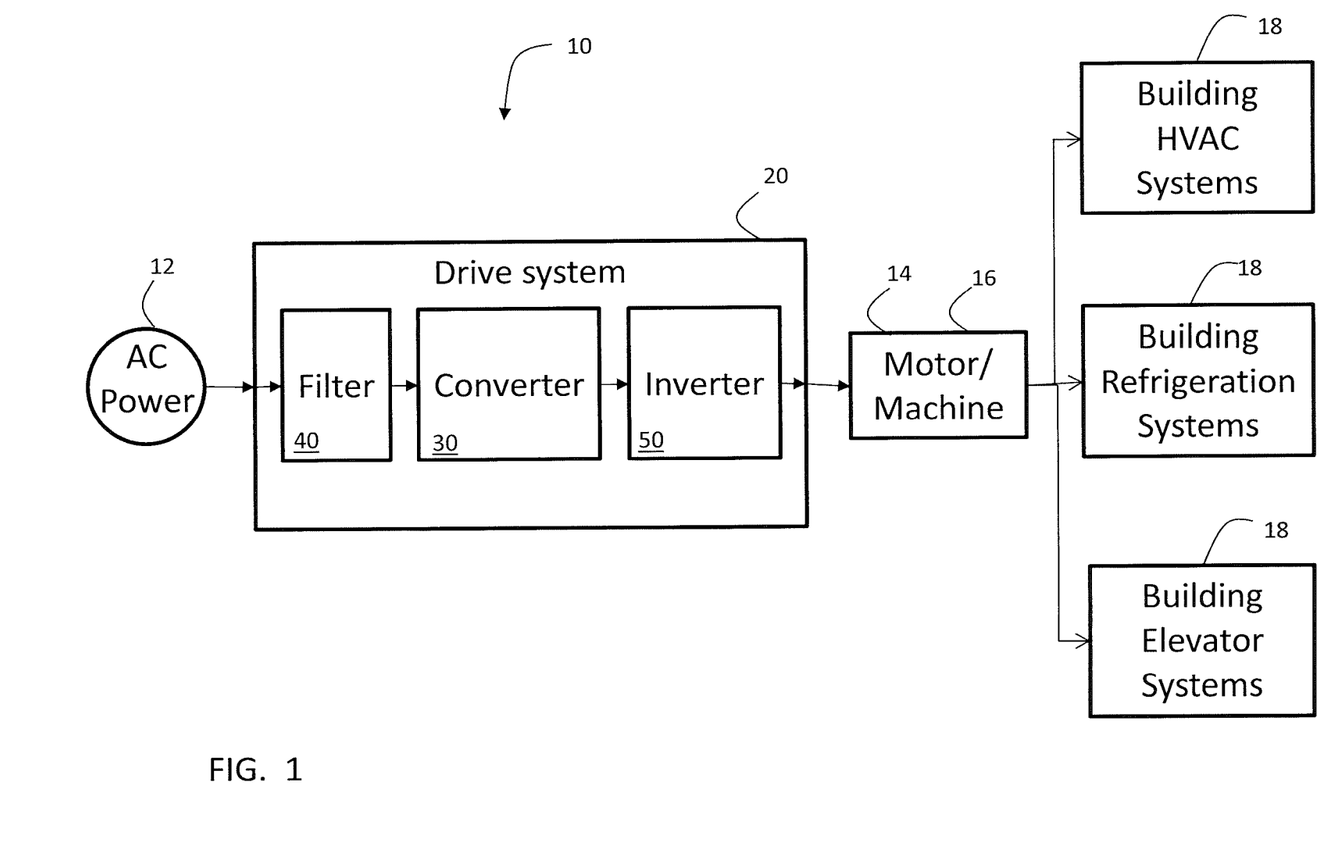
FIG. 1 is a block diagram of components of a motor drive system in accordance with an embodiment.

FIG. 1 is a block diagram of components of a power system 10 as may be employed to power one or more building systems or loads 18. The power system 10 is described with respect to elevator system, however application to any system where a motor drive is employed may be envisioned. Power system 10 includes a source of AC power 12, such as an electrical main line (e.g., 440/220 volt, 1-phase). The AC power 12 is provided to a drive system 20. In addition, the drive system 20 may be configured as a conventional three phase drive operating from a single phase AC power 12. The drive 20 may include a filter 40 configured to limit inrush currents, stabilizes voltage levels and suppress electromagnetic interference (EMI). The drive may also include a converter 30 to convert the AC power 12 to a DC voltage. Each drive also includes an inverter 50 to convert the DC voltage to multiphase, AC drive signals. Drive signals from the inverter 50 of the drive system 20 are supplied to a multiphase machine 14 to control a building system. For example, a motor 16 to impart motion to elevator car as part of the building system 18. In an exemplary embodiment, machine 14 includes a multiphase, permanent magnet synchronous motor 16. It should be appreciated, that while the embodiments herein are described primarily with reference to an elevator system and application, this description is for example only. The embodiments described here are readily applied to any application employing a three phase drive in a single phase application including HVAC, refrigeration and any other power system and motor control application as depicted in the figure.

Figure 2:
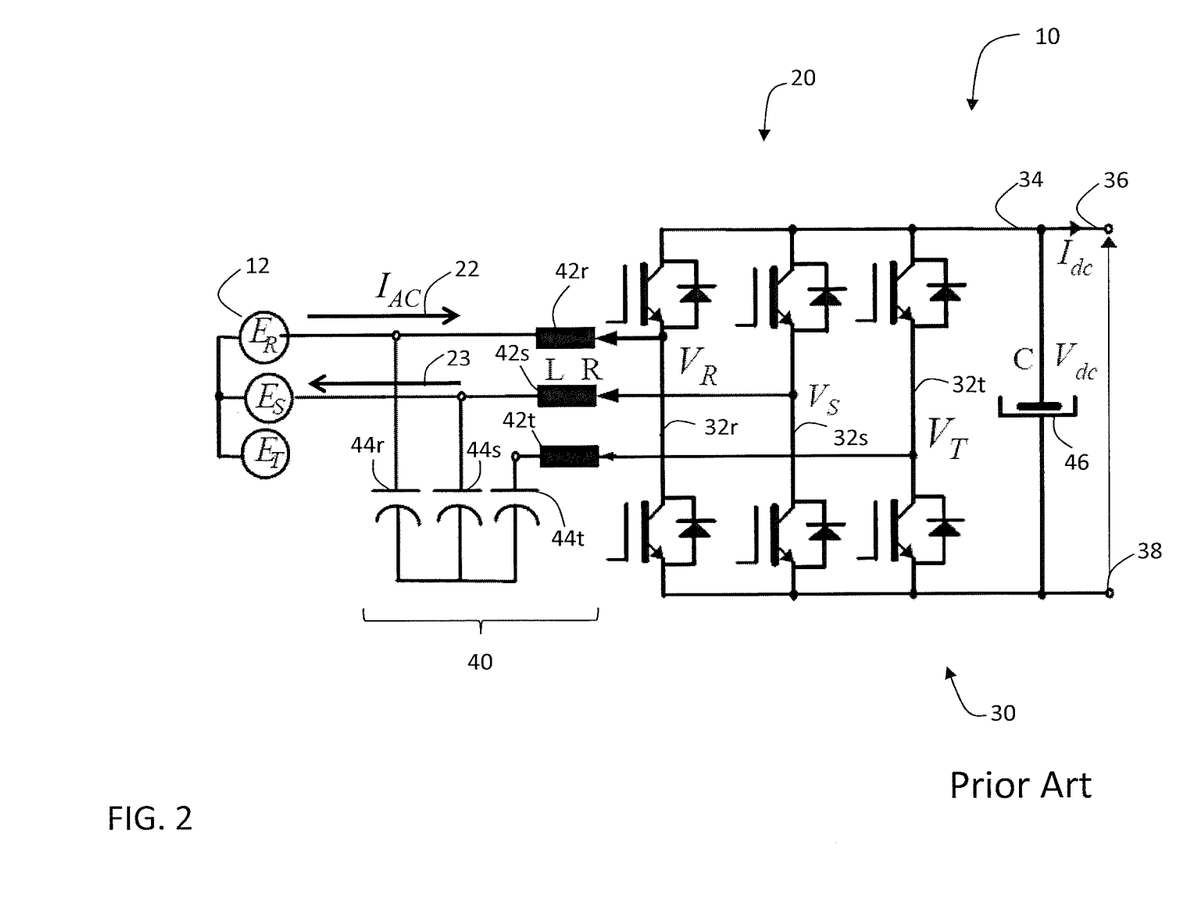
FIG. 2 is a simplified schematic of a 3 phase drive configured for use in an single phase application.

FIG. 2 is a simplified schematic of a power system 10 with a 3 phase drive converter as conventionally applied employing a single phase excitation source embodiments. The power system 10 includes a source of AC power 12, such as an electrical main line (e.g., 220 volt, 1-phase). Drive 20 includes a converter 30 having 3 phase legs, R, S, and T also denoted as 32r, 32s, and 32t respectively. Each phase leg, R, S, and T, (32r, 32s, and 32t) includes switching devices controlled by control signals from a drive controller (60) to convert AC power to DC power across a DC bus 34 with a positive terminal 36 with a negative terminal 38. The single phase AC power 12 is connected to an filter 40. The filter 40 receives current from the AC power source 12 to the drives 30 in series through inductive/reactive elements 42r, 42s, and 42t (e.g., inductors) and then connected to the three phase legs R, S, and T, (32r, 32s, and 32t) respectively. Likewise each inductive/reactive element 42r, 42s, and 42t is also coupled to another reactive element 44r, 44s, and 44t (e.g., capacitors) connected in parallel and commonly connected as depicted. Filter 40 operates as a current transient/voltage suppression filter.

Conventionally, in such an application, the incoming current IAC as denoted by arrow 22 is connected to and passes through reactances 42r, 44r and is rectified in the R phase leg 32r. Likewise, the return current as denoted by arrow 23 is connected to and passes through reactances 42s, 44s from to the S phase leg 32s. It should be noted that the T phase leg 32t and reactances 42t, 44t of the conventional three phase converter 30 are not employed. Thus, in such a configuration the entire incoming current 22 from the single phase AC power source 12 is carried by a single phase leg, i.e., phase leg 32r and reactances 42r. While the entire return current 23 is carried by the S phase leg 32s and reactances 42s. This configuration results in limited capability of the convert 30 and thereby the drive 20. As such, when a conventional three phase converter is employed in this manner with a single phase AC power source 12, the rating of the drive is derated approximately 50%.

Figure 3:
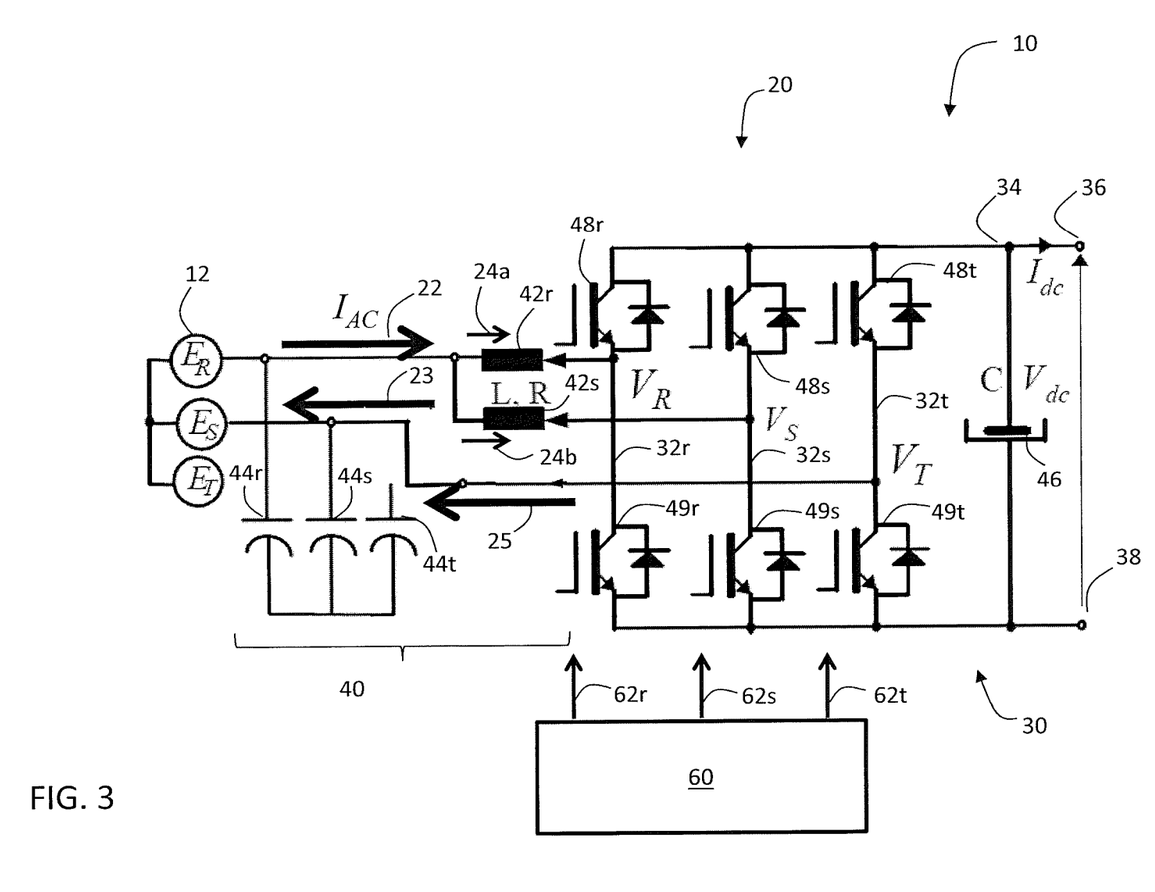
FIG. 3 is a block diagram of a 3 phase drive configured for use in an single phase application in accordance with an embodiment.
Figure 4:
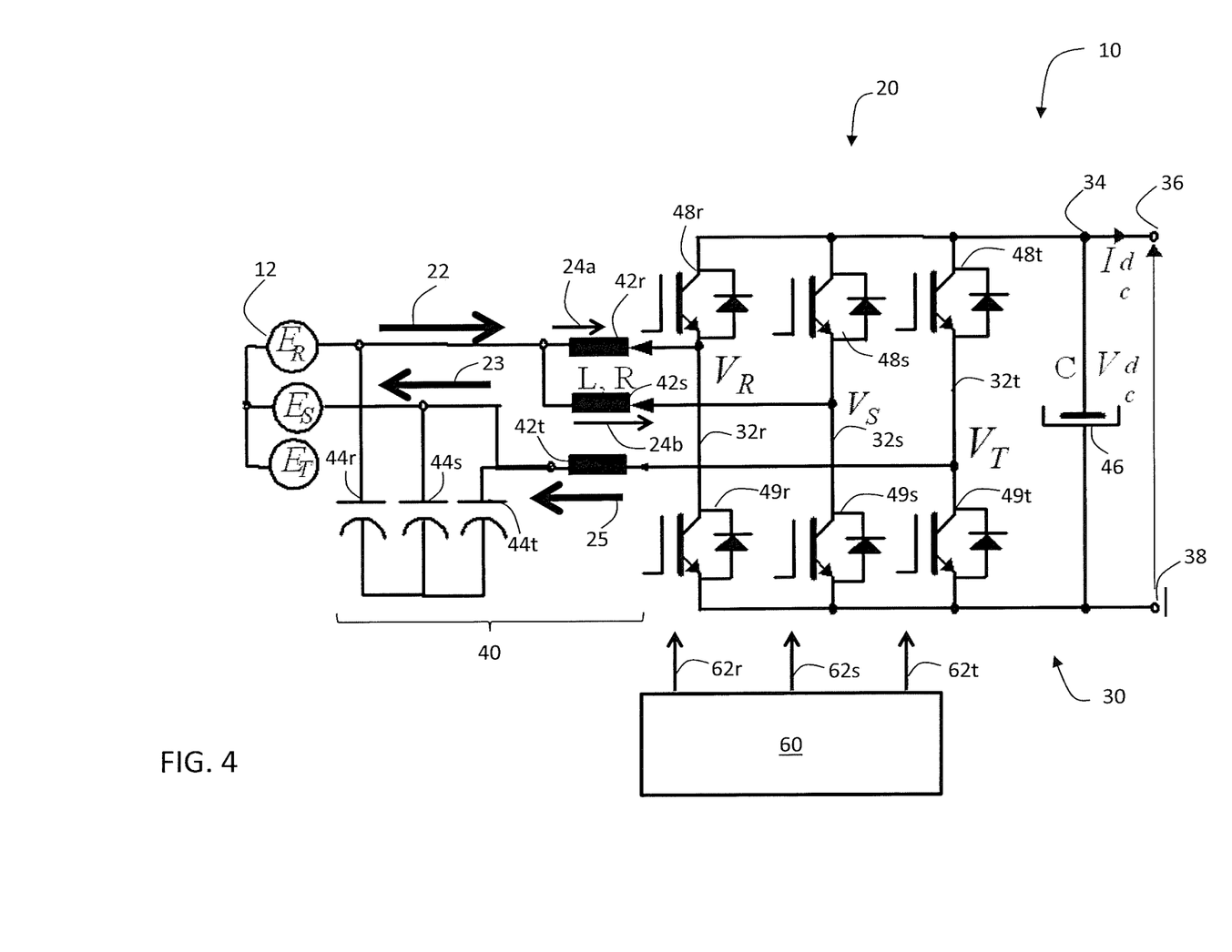
FIG. 4 is a block diagram of a 3 phase drive configured for use in an single phase application in accordance with an embodiment.

Turning now to FIGS. 3 and 4 as well, where FIG. 3 depicts a simplified block diagram of a converter 30 portion of a drive 20 in a power system 10 in accordance with an embodiment. FIG. 4 depicts another simplified schematic of a converter 30 portion of a drive 20 in a power system 10 in accordance with an embodiment. The power system 10 includes a source of AC power 12, such as an electrical main line (e.g., 440/220 volt, 1-phase). Each drive system 20 once again includes a converter 30, to convert the AC power 12 to a DC voltage.

FIG. 3 is a more detailed diagram of the 3-phase drive 20 operating from a single phase AC source 12 of an embodiment. Each of drives 20, includes an active converter 30, having 3 phase input, R, S and T to convert AC power from the utility 12 to DC power comparable to that depicted and described with respect to FIG. 2. The output of the active converter 32, is directed to the DC bus 34. The capacitor 46, is placed across a first DC bus 34 with a positive terminal 36 and a negative terminal 38. In operation, current and voltages will change on the DC bus 34 as a function of the switching and loading from the inverter 50 providing command signals to the motor 16 (FIG. 1). The reactances 42r, 42s, 42t operate with increased impedance to oppose those changes or transients in the input current. Likewise, capacitor 46, operates in a conventional manner to oppose any voltage changes on the DC bus 34.

Continuing with FIG. 3 and FIG. 4, drive 20 includes a converter 30 having 3 phase legs, R, S, and T also denoted as 32r, 32s, and 32t respectively. Each phase leg, R, S, and T, (32r, 32s, and 32t) includes switching devices 48r, 49r; 48s, 49s; and 48t, 49t respectively. The switching devices 48r, 49r; 48s, 49s; and 48t, 49t are controlled by control signals 62r, 62s, 62t from a drive controller (60) to convert AC power to DC power across a DC bus 34 with a positive terminal 36 with a negative terminal 38. Similar to the description with respect to FIG. 1, a filter 40 receives current from the AC power source 12 to the drives 30 in series through inductive/reactive elements 42r, 42s, and 42t (e.g., inductors) and then connected to the three phase legs R, S, and T, (32r, 32s, and 32t) respectively. Likewise each inductive/reactive element 42r, 42s, and 42t is also coupled to another reactive element 44r, 44s, and 44t (e.g., capacitors) connected in parallel and commonly connected as depicted. Filter 40 operates as a current transient/voltage suppression filter. In an embodiment, the filter 40 includes one or more line reactances and electromagnetic interference (EMI) capacitances.

In application of one embodiment, the incoming current IAC as denoted by arrow 22 is connected to and passes through reactances 42r, 44r as depicted by arrow 24a and is rectified in the R phase leg 32r, as well as reactances 42s, 44s as depicted by arrow 24b and is rectified in S phase leg 32s. This approach splits the incoming current in half with it being shared in the R phase leg 32r and the S phase leg 32s. In this embodiment, the return current as denoted by arrows 23 and 25 is connected to and passes through no reactances from the T phase leg 32t. Reactances 42t, 44t of the conventional three phase converter 30 are either not connected or not employed as depicted. Advantageously, this approach splits the incoming current IAC in half with it being shared in the R phase leg 32r and the S phase leg 32s. While the entire return current 23 is carried by the T phase leg 32t. Furthermore, because all of the switching devices of the phase legs 32r, 32s, and 32t are active this approach also reduces the switching losses incurred in the switching devices 48r, 49r; 48s, 49s; and 48t, 49t of each phase leg 32r, 32s, as well as 32t respectively. Moreover, the switching losses in the switching devices 48t, 49t in incurred in phase leg 32t are greatly reduced as the switching devices 48t, 49t in phase leg 32t carrying the return current need only switch at the frequency of the AC power source 12, not the switching frequency of the pulse width modulation (PWM) control signals applied to the switching devices 48r, 49r; 48s, 49s of the phase legs 32r, and 32s.

It will be appreciated that in an embodiment the reactances may optionally be modified with reduced values relative to the configuration of the conventional 3 phase converter of FIG. 2. While an objective of employing the three phase drive 20 in a single phase application is to save cost of development, support and maintenance, e.g., less parts, common repairs, and the like. In some instances it may be desirable to be able to take advantage of the existing designed topology of the three phase drive 20 and converter 30 and save even further costs by employing less expensive components. For example in this instance, the reactances 42r, 43s may be reduced values and/or eliminated (as with reactances 42t, 44t). Likewise, the values of the reactances 44r, 44s, and 44t may also be modified or in the case of 44t eliminated. Advantageously, this configuration results in improved capability of the converter 30 and thereby the drive 20 to handle additional current relative to the conventional configuration of FIG. 2. As such, when a conventional three phase converter is employed in this manner with a single phase AC power source 12, the three phase rating of the drive is derated by only about 20% as each of the phase legs 32r, 32s, and 32t are carrying at least a portion of the current load. In some embodiments the deration may be higher, on the order of 25% or even 30%. Advantageously though, the deration is less than that seen with conventional applications to three phase drives in single phase excitation applications.

Turning now to FIG. 4, another variation of the topology of employing the three phase converter with a single phase AC power source 12 in accordance with another embodiment is depicted. This topology is very similar to that of FIG. 3 except with distinctions as described herein. In application of this embodiment, the incoming current IAC as denoted by arrow 22 is connected to and passes through reactances 42r, 44r as depicted by arrow 24a and is rectified in the R phase leg 32r, as well as reactances 42s, 44s as depicted by arrow 24b and is rectified in S phase leg 32s as described previously. Once again, this approach splits the incoming current in half with it being shared in the R phase leg 32r and the S phase leg 32s. In this embodiment, the return current as denoted by arrows 23 and 25 is connected to and passes through reactance 42t from the T phase leg 32t. Once again, advantageously, this approach splits the incoming current IAC in half while the return current 23 is carried by the T phase leg 32t. Furthermore, because all of the switching devices 48r, 49r; 48s, 49s; and 48t, 49t of the phase legs 32r, 32s, and 32t respectively are active this approach also reduces the switching losses incurred in the switching devices 48r, 49r; 48s, 49s; and 48t, 49t of each phase leg 32r, 32s, as well as 32t are greatly reduced as described above.

In an embodiment, the reactances 42r, 42s, 42t as well as 44r, 44s, 44t all remain the same as employed in the conventional three phase drive 20 configuration. It will be appreciated that the advantage of this configuration is that it requires minimal modifications to be configured for operation from single phase excitation e.g., power source 12. In this embodiment the only modifications are the connection of the reactance 42S to receive the incoming current as depicted by arrow 22, and the connection from reactance 42t to reactances 44s and optionally 44t to carry the return current depicted by arrow 23. It will be appreciated that in yet another embodiment the reactances 42r, 42s, 42t, and 44r, 44s and 44t may optionally be modified with reduced values relative to the configuration of the conventional 3 phase converter of FIG. 2 as described above.

Advantageously, each of the configurations described with respect to the various embodiments results in improved capability of the converter 30 and thereby the drive 20 to handle additional current relative to the conventional configuration of FIG. 2. As such, when a conventional three phase converter is employed in this manner with a single phase AC power source 12, the three phase rating of the drive is derated by only about 20% as each of the phase legs 32r, 32s, and 32t are carrying at least a portion of the current load. In some embodiments the deration may be higher, on the order of 25% or even 30%. Advantageously though, the deration is less than that seen with conventional applications to three phase drives in single phase excitation applications.

Continuing with FIGS. 3 and 4, the drive system 20 may further include an inverter 50 to generate drive signals to drive the motor 16 (shown in FIG. 1) as is conventionally known. The inverter 50 conventionally having 3 phase legs. Each phase leg, includes switching devices controlled by control signals from a drive controller 60 in a conventional manner to convert DC power across the DC bus 34, to AC drive signals to power motor 16 (See FIG. 1). The inverter 50, may be conventional for motor drives 20 employing at least six switching devices in three separate parallel legs, two switching devices per leg.

In an embodiment both converter 30 and inverter 50, are controlled by a controller 60. In an alternative embodiment, converter 30 and inverter 50 may be controlled by separate drive controllers, 60. Drive controller(s) 60 provides control signals 62r, 62s, 62t to the switching devices 48r, 49r; 48s, 49s; and 48t 49t of the R, S, and T phase legs 32r, 32s, and 32t respectively to control generation of the DC voltage on the DC buses 34. Likewise the controller 60 provides control signals to the inverter 50 to control generation of the drive signals to motor 16. Drive controller 60 may be implemented using a general-purpose microprocessor executing a computer program stored on a storage medium to perform the operations described herein. Alternatively, drive controller 60 may be implemented in hardware (e.g., ASIC, FPGA) or in a combination of hardware/software.

Figure 5:
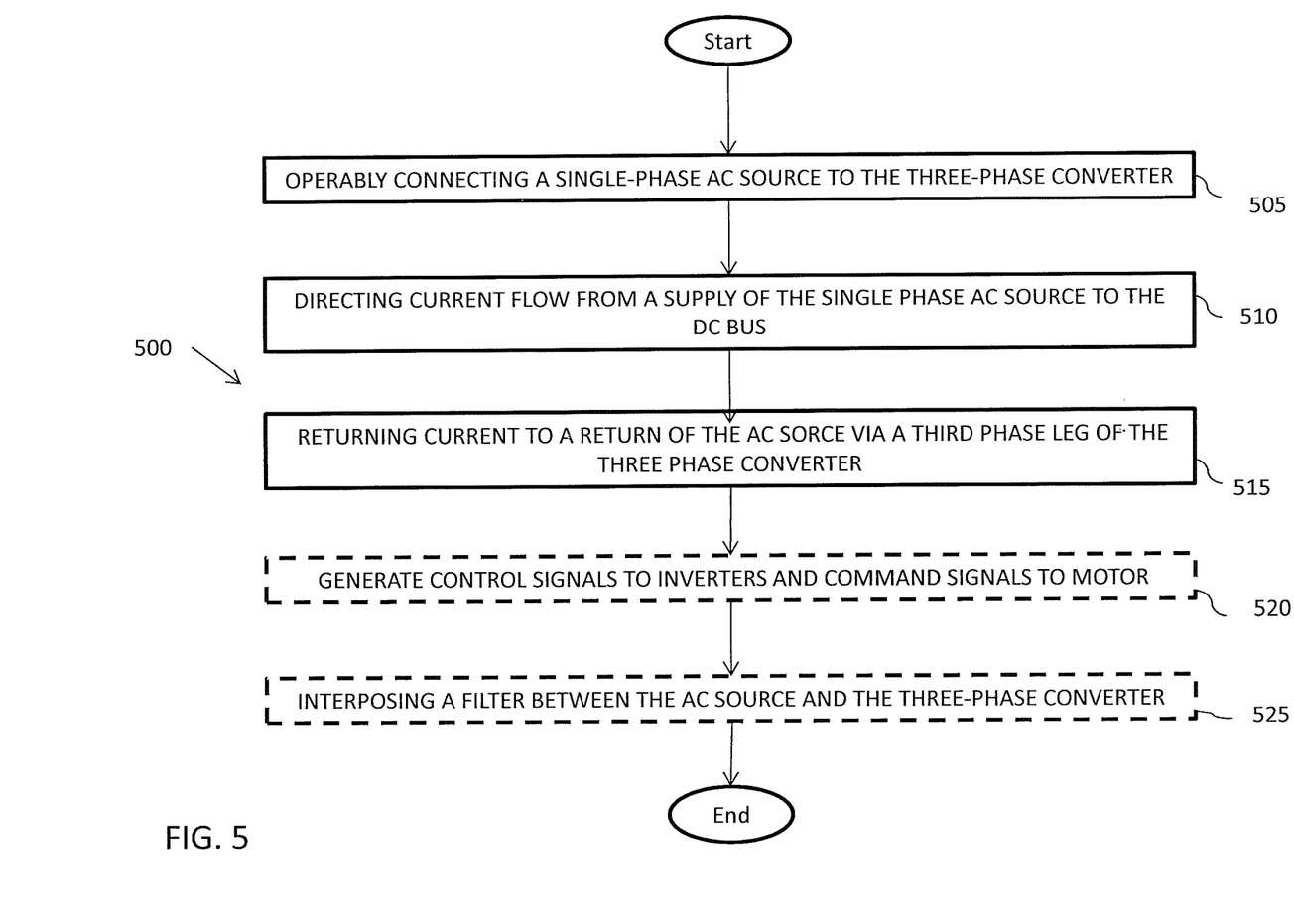
FIG. 5 depicts a flowchart of a method of controlling a paralleled drive in accordance with an embodiment.

Turning now to FIG. 5, where a control methodology 500 for the drive 20 is depicted. For simplicity, reference is made to drive 20 of FIGS. 3 and 4 and their various elements, while it should be appreciated the description may be equally applicable to the other embodiments and so on. In the various embodiments, reference will be made to controlling both the converter 30 as well as the inverter 50. In some instances similar schemes may be employed to control the converter 30 as well as the inverter 50 whether with multiple controllers, or the use of a single controller 60. In other instances different control schemes may be employed.

In an embodiment, to control the when the converter 30 when connected as depicted in FIGS. 3&4, the control method employed is to simply operate the R and S phase legs 32r, 32s together in synchronization. The PWM duty cycles for the commands signals 62r, and 62s to R and S phase legs 32r, 32s respectively are controlled with a proportional integral controller algorithm. The switching devices 48r, 49r and 48s, 49s operating at the PWM frequency, e.g., on the order of 10-100 kHz. Meanwhile, the switching devices 48t, 49t of the T phase leg 32t providing the current return path, operate at the frequency of the AC power source 12 and in approximate synchronization with it. It should be appreciated that in some embodiments the control scheme for the converter 30 may be linked to the control scheme of the inverter 50. The control scheme employed may depend on the particular drive topology employed, the configuration of the system and selected design constraints.

Continuing with FIG. 5, the method initiates at process step 505 with connecting the three phase converter 30 of three phase drive 20 of FIGS. 3&4 to a single-phase AC source 12 as described herein. The switching devices 48r, 49r; 48s, 49s; of the R and S phase legs 32r and 32s are controlled in an manner to rectify the incoming current from the AC source 12 and direct it to the DC bus 34 as depicted at process step 510. Likewise, at process step 515 to complete the circuit, the switching devices 48t, 49t of the T phase leg 32 of the converter 30 are controlled to return current to the return leg of the AC source. Advantageously, as described earlier, this approach provides for a more efficient use of the three phase converter topology by employing all three phase legs 32r, 32s, and 32t. Continuing with the method 500, optionally the drive may include generating control signals to control the operation of the switching devices of the inverter 50 in a manner to generate command signals for the motor 16. In and embodiment, the methodology 500 may further include interposing a filter 40 between the AC source 12 and the three phase converter 30.

Embodiments include the use of three phase drives in order to meet applications with single phase power without the need to design or source a single phase drive. This eliminates the cost and/or development time associated with a single phase drive for those limited applications. Advantageously, the embodiments described herein facilitate taking complete advantage to the topology of the legacy three phase drives to save costs and improve current capability and limit derating.

The terminology used herein is for the purpose of describing particular embodiments only and is not intended to be limiting. While the description has been presented for purposes of illustration and description, it is not intended to be exhaustive or limited to the form disclosed. Many modifications, variations, alterations, substitutions, or equivalent arrangement not hereto described will be apparent to those of ordinary skill in the art without departing from the scope of the disclosure. Additionally, while the various embodiments have been described, it is to be understood that aspects may include only some of the described embodiments. Accordingly, embodiments are not to be seen as being limited by the foregoing description, but is only limited by the scope of the appended claims.

What is claimed is:

1. A three-phase regenerative drive configured for operation from a single phase alternating current (AC) power source, the three-phase regenerative drive comprising:
   a three-phase converter having inputs for connection to a single-phase AC source, the three-phase converter having three phase legs;
   a three-phase inverter for connection to a motor, the three phase inverter configured to provide three phase command signals to the motor;
   a DC bus connected between the three-phase converter and the three-phase inverter; and
   wherein a first phase leg and a second phase leg are employed to direct current from the single-phase AC source to the DC Bus such that current from the single-phase AC source is shared between the first phase leg and the second phase leg and wherein a third phase leg of the three phase legs of the three-phase converter returns current to a return of the AC source;
   wherein the current from the single-phase AC source shared between the first phase leg and the second phase leg of the converter is provided to the three-phase inverter to produce signals to impart motion to the motor to move an elevator car;
   the three-phase regenerative drive further including a controller for providing control signals to the three-phase converter to control respective contributions of current via the first phase leg and the second phase leg to the DC Bus by the single-phase AC source and to control the return of current to the AC source via the third phase leg;
   wherein the control signals include at least a first set of pulse width modulation (PWM) signals to control at least the first and second switching devices of the first phase leg and second phase leg of the three phase converter, and a second set of pulse width modulation (PWM) signals to control the first and second switching devices of the third phase leg of the three phase converter;
   wherein the first set of PWM signals operates at a first frequency and the second set of PWM signals operates at a second frequency, the second frequency less than the first frequency, the second frequency corresponding to the frequency of the single phase AC source;

wherein the respective contributions of current via the first phase leg and the second phase leg to the DC Bus are about equal, and the current returned to the AC source via the third phase leg is about a total of the respective contributions of current via the first phase leg and the second phase leg.

2. The three-phase regenerative drive of claim 1, wherein the each phase leg of the three phase legs of the three-phase converter includes a first and a second switching device.

3. The three-phase regenerative drive of claim 1, further including the controller configured to generate control signals to the three-phase inverter.

4. The three-phase regenerative drive of claim 1, further comprising a filter interposed between the AC source and the three-phase converter.

5. The three-phase regenerative drive of claim 4 wherein the filter comprises at least two series reactances configured to transfer current from the AC source to the first phase leg and the second phase leg.

6. The three-phase regenerative drive of claim 1 wherein the drive is derated by no more than about 25%.

* * * * *